United States Patent [19]

Shirahata et al.

[11] Patent Number: 4,582,746

[45] Date of Patent: Apr. 15, 1986

[54] MAGNETIC RECORDING MEDIUM

[75] Inventors: Ryuji Shirahata; Tatsuji Kitamoto, both of Kanagawa, Japan

[73] Assignee: Fuji Photo Film Co., Ltd., Kanagawa, Japan

[21] Appl. No.: 585,095

[22] Filed: Mar. 1, 1984

[30] Foreign Application Priority Data

Mar. 1, 1983 [JP] Japan .................................. 58-33450

[51] Int. Cl.⁴ .............................................. G11B 5/72
[52] U.S. Cl. .................................... 428/216; 360/134;
360/135; 360/136; 427/41; 427/131; 427/132;
428/336; 428/694; 428/695; 428/900
[58] Field of Search ................. 427/41, 132, 131, 128;
428/694, 900, 216, 336, 695; 360/134–136

[56] References Cited

U.S. PATENT DOCUMENTS

| | | | |
|---|---|---|---|
| 4,220,117 | 9/1980 | Shinohara | 427/132 |
| 4,323,629 | 4/1982 | Kunieda | 428/457 |
| 4,418,126 | 11/1983 | Izumi | 428/692 |
| 4,419,404 | 12/1983 | Arai | 427/41 |
| 4,429,024 | 1/1984 | Meno | 427/41 |
| 4,450,186 | 5/1984 | Shinohara | 428/900 |
| 4,521,482 | 6/1985 | Arai | 427/41 |

Primary Examiner—Ellis P. Robinson
Attorney, Agent, or Firm—Sughrue, Mion, Zinn, Macpeak & Seas

[57] ABSTRACT

Weather resistance and lubricity of a magnetic recording medium comprising a non-magnetic support having provided thereon a vapor deposited magnetic thin film mainly composed of cobalt, nickel and oxygen can be improved by limiting the amount of nickel and the number of oxygen atoms to a specific value and by providing a plasma polymerized layer on the magnetic thin film.

5 Claims, 2 Drawing Figures

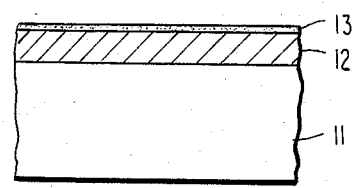
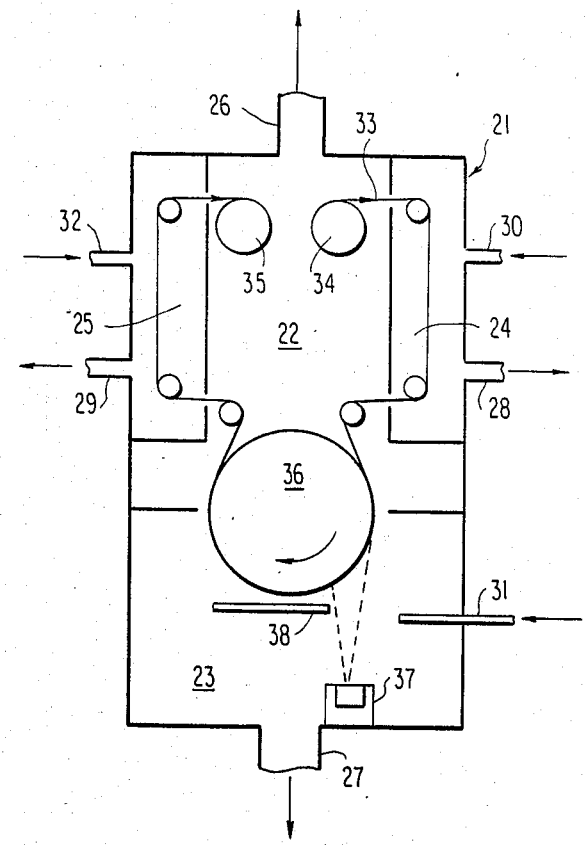

MAGNETIC RECORDING MEDIUM

FIELD OF THE INVENTION

The present invention relates to a thin film type magnetic recording medium having improved weather resistance and running properties.

BACKGROUND OF THE INVENTION

A coated type magnetic recording medium has been widely used which is prepared by dispersing magnetic particles (e.g., $\gamma$-Fe$_2$O$_3$, Co-doped $\gamma$-Fe$_2$O$_3$, Fe$_3$O$_4$, Co-doped Fe$_3$O$_4$, Bertholide compound of $\gamma$-Fe$_2$O$_3$ and $\gamma$-Fe$_3$O$_4$, magnetic oxide particles such as CrO$_2$, magnetic alloy particles mainly composed of ferromagnetic particles such as Co or Ni) in an organic binder such as a vinyl chloride-vinyl acetate copolymer, a styrene-butadiene copolymer, an epoxy resin or a polyurethane resin, coating the composition on a non-magnetic support, and drying.

With the recent increase in the amount of information to be recorded, a magnetic recording medium suitable for high density recording must be manufactured. Various research and studies have been developed to manufacture a thin film type magnetic recording medium which is prepared by forming a ferromagnetic thin film on a non-magnetic support by vacuum evaporation, sputtering, ion plating or plating without using a binder which is used for preparing a coated type magnetic recording medium.

The vacuum deposition method for preparing a magnetic recording medium by vaporizing magnetic metal in a vacuum atmosphere and coating it on a non-magnetic support to form a thin film is practically very useful because the steps and appratuses for preparing the film are relatively simple.

However, a metal thin film type magnetic recording medium has poor anti-corrosion properties and poor lubricity. Many attempts have been made to remove the above defects but satisfactory solutions have not been obtained. For example, there are a method of incorporating a metal such as Cr to improve anti-corrosion property of a magnetic recording layer itself, a method of conducting vapor deposition of magnetic metal in an oxygen atmosphere to incorporate oxygen, and further over-coating metal such as Al or Cr metal oxide thereof to provide anti-corrosion properties and lubricity and still further providing high molecular materials and lubricants by vapor deposition, coating and plasma polymerization. However, none of those have been found to be satisfactory.

SUMMARY OF THE INVENTION

An object of the present invention is to provide a thin film type magnetic recording medium having improved weather resistance and lubricity.

That is, the present invention relates to a magnetic recording medium comprising a non-magnetic support having provided thereon a vapor-deposited magnetic thin film composed of cobalt, nickel and oxygen, the amount of nickel being 1 to 10 wt. % based on the total amount of cobalt and nickel, the number of oxygen atoms in the magnetic thin film being 5 to 45% based on the total number of cobalt and nickel atoms, and a plasma polymerized layer being provided on the magnetic thin film.

Inventors of the present invention made extensive research as to the combination of a magnetic recording layer of alloys of cobalt and nickel and a plasma polymerized film and have reached the present invention of a thin film type magnetic recording medium having excellent weather resistance and lubricity. Th advantages thereof are excellent.

BRIEF DESCRIPTION OF DRAWINGS

FIG. 1 is a cross-sectional view showing a fundamental structure of the magnetic recording medium of this invention; and FIG. 2 is one embodiment of an apparatus for preparing the magnetic recording medium of this invention.

DETAILED DESCRIPTION OF THE INVENTION

In FIG. 1, magnetic recording layer 12 prepared by vapor deposition mainly composed of cobalt, nickel and oxygen is provided on a non-magnetic plastic support 11 such as polyethylene terephthalate, polyimide, polyamide, polyvinyl chloride, cellulose triacetate, polycarbonate, or polyethylene naphthalate, a non-magnetic metal support such as Al, Al alloy, Ti, Ti alloy, copper, copper alloy or stainless steel, or a non-magnetic suppor such as glass or ceramic. Of these support materials polyethylene terephthalate is preferred. The magnetic recording layer contains 1 to 10 wt. % of nickel based on the total amount of cobalt and nickel, and includes oxygen atoms in an amount of 5 to 45% based on the total number of cobalt and nickel atoms. The number of oxygen atoms can be measured by the Auger electron spectrography as described in *J. Applied Physics* 38 p. 4355 (1967). Elements such as Fe, Cu, Si. Al, Mn, N, P, Cr, Sn, Sb, Bi, W, Mo, Mg, Zn, Zr, Y, Sm, Gd, N or B may be present in an amount less than the amount of nickel and that of oxygen. These elements may be present in an amount of not higher than 5 wt. % based on the total weight of the cobalt and nickel. The thickness of the magnetic recording layer is generally about 0.02 $\mu$m to 4 $\mu$m and preferably 0.05 $\mu$ to 1 $\mu$m.

A plasma polymerized layer 13 is provided on the magnetic recording layer 12. The term "plasma polymerized layer" as used herein means an organic high molecular layer formed on the magnetic recording layer which is prepared by plasma polymerizing organic monomer gas by DC, AC, or high frequency discharge. Organic monomer gas can be directly ionized or organic monomer can be introduced where gas discharge such as Argon gas discharge is carrried out. In this invention the thickness of a plasma polymerized layer is preferably 20 to 800 Å and more preferably 20 to 400 Å.

Examples of useful organic monomer gases include tetrafluoromethane, tetrafluoroethylene, hexafluoroethane, perfluoropropane, octafluorocyclobutane, methane, ethylene propylene, butylene, vinyl chloride, styrene, chlorobenzene, dimethylsiloxane, hexamethyl disilazane or diethylamino trimethylsilane.

FIG. 1 is a magnetic recording medium which includes the essential component layers of this invention. A magnetic recording layer can be a single layer or multi-layered structure having more than two layers. Non-magnetic intermediate layers can be provided between the layers of a multi-layer structure. A non-magnetic undercoat layer can be provided between a non-magnetic support and a magnetic recording layer. Magnetic recording layers can be provided on opposite surfaces of the non-magnetic support. A back coating layer can be provided on the non-magnetic support opposite to the magnetic recording layer and a non-magnetic recording layer can further be provided on the plasma polymerized layer.

FIG. 2 is a schematic view of an apparatus for preparing a magnetic recording medium of this invention. A vacuum apparatus 21 is composed of an upper compartment 22 a lower compartment 23, a pre-treating compartment 24 and a plasma polymerization compartment 25. Gas can be expelled from gas exits 26, 27, 28 and 29 independently. Gas inlets 30, 31 and 32 are provided to introduce a predetermined amount of gas into the vacuum apparatus 21. A roll feeding portion 34 and a roll winding portion 35 of the tape shape non-magnetic support 33 are installed in the upper compartment 22. The support 33 is surface treated by a means such as ion bombard treatment in the pre-treating compartment 24 and is guided to the lower compartment 23 along with the cooling can 36. An evaporation source 37 of cobalt and nickel alloy is installed in the lower compartment 23, where the non-magnetic support 33 which is forwarded along with the cooling can 36 is subjected to oblique vapor deposition through a mask 38. Gas containing oxygen is introduced from the pipe 31 and a magnetic recording layer mainly composed of cobalt, nickel and oxygen can be obtained. The support which is provided with the magnetic recording layer is guided from the lower compartment 23 to the plasma polymerization compartment 25 to form a predetermined plasma polymerized layer on the magnetic recording layer and is wound by the roll winding portion 35 in the upper compartment 22.

The present invention will be explained in more detail by the following Examples but should not be limited thereto.

EXAMPLE 1

The apparatus shown in FIG. 2 was used. A magnetic recording layer mainly composed of cobalt, nickel and oxygen was provided by vapor deposition in a thickness of 1200 Å on a polyethylene terephthalate film having a thickness of 11 μm and further a plasma polymerized layer having a thickness of 100 Å was provided thereon to prepare a magnetic recording medium. Specifically this process will be explained as follows.

Cobalt and nickel alloys having various compositions was charged on the evaporation source 37 and magnetic recording layers of cobalt, nickel and oxygen having various ratios thereof were prepared by varying the amount of oxygen introduced through the pipe 31. The angle of incidence which is determined by the mask 38 was set at 40°. A plasma polymerized layer of dimethyl siloxane having a thickness of 100 Å was provided on the thus-prepared magnetic recording layer. The pressure in the plasma polymerization compartment 25 was $5 \times 10^{-3}$ Torr and plasma polymerization was carried out using a high frequency discharge of 200 W. Then the magnetic recording layer was slit to a width of ½ inch to prepare magnetic tapes, which made 50 passes on the VHS type VTR and weather resistance and lubricity were measured. Weather resistance was evaluated by the decrease of the magnetized layers (demagnetization) before and after the magnetic recording layer were allowed to stand at 60° C. and 90% RH for one week. Lubricity was evaluated by the abrasion coefficient against a stainless steel pole having a diameter of 6 mm. The results are shown in Table 1.

TABLE 1

| Sample No. | Composition of Magnetic Thin Film | | | Demagnetization | Abrasion Coefficient |
|---|---|---|---|---|---|
| | Ratio of Co and Ni (Weight Ratio) | | Oxygen Content (Ratio of Oxygen Atom Number to Total Co and Ni Atom Number) (%) | | |
| | Co | Ni | | | |
| 1 | 80 | 20 | 0 | −22% | 0.50 |
| 2 | 80 | 20 | 10 | −20% | 0.52 |
| 3 | 80 | 20 | 30 | −25% | 0.53 |
| 4 | 90 | 10 | 0 | −15% | 0.45 |
| 5 | 90 | 10 | 10 | −6% | 0.22 |
| 6 | 90 | 10 | 30 | −5% | 0.23 |
| 7 | 90 | 10 | 50 | −18% | 0.32 |
| 8 | 97 | 3 | 0 | −12% | 0.35 |
| 9 | 97 | 3 | 5 | −6% | 0.21 |
| 10 | 97 | 3 | 25 | −7% | 0.22 |
| 11 | 97 | 3 | 45 | −8% | 0.23 |
| 12 | 97 | 3 | 65 | −20% | 0.43 |

It is clear from the above table that a magnetic recording medium comprising a magnetic recording layer containing cobalt, nickel and oxygen in such a ratio that the amount of nickel was 1 to 10 wt. % of the total cobalt and nickel and that the number of oxygen atoms was 5 to 45% of the total number of cobalt and nickel atoms and a plasma polymerized layer of dimethyl siloxane provided thereon has excellent weather resistance and lubricity even after the magnetic recording medium was repeatedly run on a VTR.

EXAMPLE 2

The apparatus as shown in FIG. 2 was used as in Example 1. A magnetic recording layer mainly composed of cobalt, nickel and oxygen was provided by vapor deposition in a thickness of 1000 Å on a polyethylene terephthalate film having a thickness of 15 μm and further a plasma polymerized layer having a thickness of 200 Å was provided thereon to prepare a magnetic recording medium. The angle of incidence determined by the mask 38 was set at 50°. The plasma polymerized layer was a styrene polymerized layer. Weather. resistance and lubiricy were evaluated in the same manner as in Example 1 and the results are shown in Table 2.

TABLE 2

| Sample No. | Composition of Magnetic Thin Film | | | Demagnetization | Abrasion Coefficient |
|---|---|---|---|---|---|
| | Ratio of Co and Ni (Weight Ratio) | | Oxygen Content (Ratio of Oxygen Atom Number to Total Co and Ni Atom Number) (%) | | |
| | Co | Ni | | | |
| 13 | 85 | 15 | 5 | −25% | 0.52 |
| 14 | 85 | 15 | 20 | −20% | 0.52 |
| 15 | 85 | 15 | 30 | −20% | 0.55 |
| 16 | 92 | 8 | 0 | −19% | 0.45 |
| 17 | 92 | 8 | 5 | −6% | 0.21 |
| 18 | 92 | 8 | 25 | −4% | 0.23 |
| 19 | 92 | 8 | 45 | −5% | 0.22 |
| 20 | 92 | 8 | 60 | −15% | 0.38 |
| 21 | 99 | 1 | 0 | −12% | 0.32 |
| 22 | 99 | 1 | 5 | −6% | 0.20 |
| 23 | 99 | 1 | 20 | −6% | 0.23 |
| 24 | 99 | 1 | 30 | −7% | 0.23 |

It is clear from the above table that a magnetic recording medium comprising a magnetic recording layer containing cobalt, nickel and oxygen in such a ratio that the amount of nickel was 1 to 10 wt. % based on the total of cobalt and nickel and that number of oxygen atoms were 5 to 45% based on the total number of cobalt and nickel atoms, and a plasma polymerized layer of styrene provided thereon exhibits excellent weather resistance and lubricity even after the magnetic recording tape was repeatedly run on a VTR.

While the invention has been described in detail and with reference to specific embodiment thereof, it will be apparent to one skilled in the art that various changes and modifications can be made therein without departing from the spirit and scope thereof.

What is claimed is:

1. In a magnetic recording medium exhibiting improved weather resistance and lubricity comprising a non-magnetic support base having provided thereon a vapor deposited magnetic thin film containing cobalt, nickel and oxygen and a plasma polymerized layer provided on the magnetic thin film, the improvement wherein the nickel is present in an amount of 1 to 10 wt. % based on the total amount of cobalt and nickel, and the number of oxygen atoms in the magnetic thin film is 5 to 45% based on the total number of cobalt and nickel atoms, wherein the plasma polymerized layer is present in a thickness in the range of 20 to 800 angstroms wherein the vapor deposited magnetic thin film is present in a thickness in the range of 0.02 μm to 4 μm.

2. A magnetic recording medium as claimed in claim 1, wherein the magnetic thin film is present in thickness in the range of 0.05 μm to 1 μm.

3. A magnetic recording medium as claimed in claim 1, wherein the plasma polymerized layer is present in a thickness in the range of 20 to 400 Å.

4. A magnetic recording medium as claimed in claim 1, wherein the vapor deposited magnetic thin film is further comprised of an additional element selected from the group consisting of Fe, Cu, Si, Al, Mn, N, P, Cr, Sn, Sb, Bi, W, Mo, Mg, Zn, Zr, Y, Sm, Gd, N and B.

5. A magnetic recording medium as claimed in claim 4, wherein the additional element is present in an amount of 5 wt. % or less based on the amount of nickel and oxygen.

* * * * *